(12) United States Patent
Bower et al.

(10) Patent No.: US 9,221,286 B2
(45) Date of Patent: Dec. 29, 2015

(54) POLYESTER FILM WITH SMOOTH SURFACE PROPERTIES FOR WINDING AND PRINTING

(71) Applicant: TORAY PLASTICS (AMERICA), INC., N. Kingstown, RI (US)

(72) Inventors: Douglas J. Bower, North Kingstown, RI (US); Hideaki Maeba, N. Kingstown, RI (US)

(73) Assignee: TORAY PLASTICS (AMERICA), INC., N. Kingstown, RI (US)

( * ) Notice: Subject to any disclaimer, the term of this patent is extended or adjusted under 35 U.S.C. 154(b) by 89 days.

(21) Appl. No.: 14/143,336

(22) Filed: Dec. 30, 2013

(65) Prior Publication Data

US 2014/0302259 A1  Oct. 9, 2014

Related U.S. Application Data

(60) Provisional application No. 61/810,087, filed on Apr. 9, 2013.

(51) Int. Cl.
*B41M 5/382* (2006.01)
*B41M 5/392* (2006.01)
(Continued)

(52) U.S. Cl.
CPC ............. *B41J 31/04* (2013.01); *B29C 47/0021* (2013.01); *B29C 47/0057* (2013.01); *B29C 47/8845* (2013.01); *B29C 47/92* (2013.01); *B32B 27/36* (2013.01); *B41J 2/325* (2013.01); *B41M 5/382* (2013.01); *B41M 5/392* (2013.01); *B41M 5/41* (2013.01); *B41M 5/50* (2013.01); *B29C 47/065* (2013.01); *B29C 47/94* (2013.01); *B29C 2947/92704* (2013.01); *B41M 2205/02* (2013.01)

(58) Field of Classification Search
CPC ........ B41M 5/382; B41M 5/392; B41M 5/41; B41M 5/50; B41M 2205/02; B29C 47/0057; B29C 47/94; B32B 27/36; Y10T 428/254; Y10T 428/259
USPC ........................ 503/227; 428/32.5, 327, 331
See application file for complete search history.

(56) References Cited

U.S. PATENT DOCUMENTS 5,328,755 A  7/1994  Mills et al.
5,855,717 A  1/1999  Beer et al.
(Continued)

FOREIGN PATENT DOCUMENTS

JP  2008-246683  10/2008

OTHER PUBLICATIONS

International Search Report and Written Opinion dated Aug. 28, 2014, directed to International Patent Application No. PCT/US2014/033557; 10 pages.
LaPorte, G. M. et al. (2003). "The Forensic Analysis of Thermal Transfer Printing," *Journal of Forensic Sciences*, 48(5): 1-9.

*Primary Examiner* — Bruce H Hess
(74) *Attorney, Agent, or Firm* — Morrison & Foerster LLP

(57) ABSTRACT

A substrate composite film for thermal transfer printing includes a biaxially oriented base layer including polyester, a first type of lubricant particles, and a second type of lubricant particles. The substrate composite film satisfies the following: (1) a ratio of maximum height SRma and peak count SPc is $1 \leq SRma/SPc \leq 4.5$, (2) a center plane average roughness Sra is 15 to 30 nm, (3) coefficient of dynamic friction is <0.60, and (4) 20 and 60 degree gloss is greater than 160 SGU. The 20 degree gloss may be equal in all directions, and the 60 degree gloss may be equal in all directions.

23 Claims, 1 Drawing Sheet

(51) Int. Cl.
    *B41M 5/41*     (2006.01)
    *B41M 5/50*     (2006.01)
    *B29C 47/00*     (2006.01)
    *B29C 47/94*     (2006.01)
    *B32B 27/36*     (2006.01)
    *B41J 31/04*     (2006.01)
    *B41J 2/325*     (2006.01)
    *B29C 47/88*     (2006.01)
    *B29C 47/92*     (2006.01)
    *B29C 47/06*     (2006.01)

(56) References Cited

U.S. PATENT DOCUMENTS

| | | | |
|---|---|---|---|
| 6,468,627 B2 | 10/2002 | Ono et al. | |
| 6,537,657 B1 | 3/2003 | Watanabe et al. | |
| 6,761,968 B2 * | 7/2004 | Kusume et al. | 428/328 |
| 6,984,437 B2 | 1/2006 | Janssens et al. | |
| 7,112,360 B2 | 9/2006 | Peiffer et al. | |
| 7,544,408 B2 | 6/2009 | Yokota et al. | |
| 2008/0015108 A1 | 1/2008 | Yamamoto et al. | |

* cited by examiner

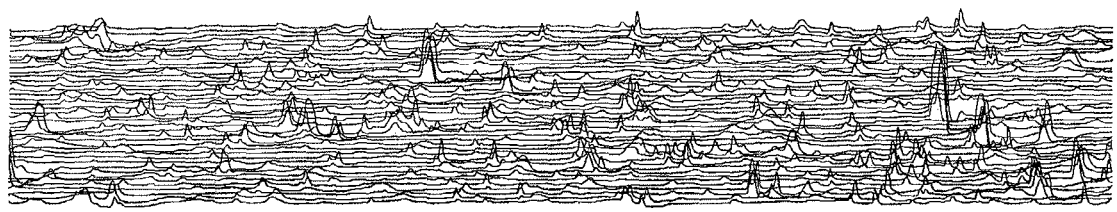

POLYESTER FILM WITH SMOOTH SURFACE PROPERTIES FOR WINDING AND PRINTING

CROSS-REFERENCE TO RELATED APPLICATION

This application claims the benefit of U.S. Provisional Application Ser. No. 61/810,087, filed Apr. 9, 2013, the entire contents of which is incorporated herein by reference.

FIELD OF THE INVENTION

This invention relates to thermoplastic films with smooth surface properties suitable for transferring ink onto substrates. More specifically, it relates to a polymeric film with a smooth surface suitable for high gloss printing onto a print medium using a sublimation type thermal transfer process.

BACKGROUND OF THE INVENTION

Biaxially oriented polyester films are used for a variety of purposes including packaging, industrial, electronic, decorative, label, and imaging applications and often perform multiple functions. For example, biaxially oriented PET films and laminations are popular, high performing, and cost-effective flexible substrates for a variety of film structures used in thermal transfer printing, such as transferring ink to substrates by thermal sublimation.

These films may, for example, be used as a thermal transfer ribbon. The films, for example, may be used in the printing of barcodes or digital photographs on paper or other suitable recipient substrate.

Thermal transfer printing applies to printing processes that utilize heat in order to produce an image by either physical or chemical means or a combination of both (G. Laporte et al., "The Forensic Analysis of Thermal Transfer Printing", J. Forensic Science, Vol. 48, No. 5 (2003)). Its predominance has evolved in the past three decades with the advent of bar coding, retailer receipts, fax machines, event tickets, high resolution digital photography and plastic identification cards.

Thermal transfer printing is a digital printing process in which material is applied to paper (or some other material) by melting a coating of ribbon so that it stays glued to the material on which the print is applied. In its simplest form the ribbon is formed from a polymeric substrate and at least one layer of ink coating. As the ribbon moves over the print head, resistive elements on the print head get heated, this causes the ink to melt. As the ink becomes molten, it releases from the substrate film and transfers onto the receiver (print surface). Release happens either via ink sublimation ("dye diffusion thermal transfer" D2T2) or by means of a wax carrier ("thermal mass transfer, TMT). The used ribbon separates from the receiver and is wound up on a take-up spindle.

Embodiments of a substrate composite film for thermal transfer printing may include a biaxially oriented base layer including polyester and lubricant particles. Embodiments of a film structure for thermal transfer printing may include a biaxially oriented base film including polyester, and lubricant particles, an adhesive layer on a surface of the biaxially oriented base layer; a colored dye coating on the adhesive layer; and a low friction coating on a surface of the biaxially oriented base layer opposite the adhesive layer.

Previous thermoplastic films for thermal transfer printing were often difficult to wind because of bad air exclusion performance on the role. For example, JP-2008-246683 describes a biaxially oriented polyester film for a sublimation-type thermosensitive image transfer recording material obtained by applying a coating solution to at least one side of a polyester film and stretching the resulting film. The describe films include large particles in small amounts, which can result in bad air exclusion when rolled.

SUMMARY OF THE INVENTION

Described are thermoplastic films with smooth surface properties suitable for transferring ink onto substrates. These films may, for example, be used as a thermal transfer ribbon. More specifically, it relates to a polymeric film with a smooth surface suitable for high gloss printing onto a print medium using a sublimation type thermal transfer process. The films, for example, may be used in the printing of digital photographs on paper or other suitable recipient substrate.

In some embodiments, a substrate composite film for thermal transfer printing includes a biaxially oriented base layer comprising polyester, a first type of lubricant particles, and a second type of lubricant particles. The substrate composite film may satisfies the following: (1) a ratio of maximum height SRma and peak count SPc is $1 \leq SRma/SPc \leq 4.5$, (2) a center plane average roughness Sra is 15 to 30 nm, (3) coefficient of dynamic friction is <0.60, and (4) 20 and 60 degree gloss is greater than 160 SGU. The 20 degree gloss may be equal in all directions, and the 60 degree gloss may be equal in all directions.

In some embodiments, the first type of lubricant particles have a number average particle diameter 3 to 15 times larger than and the second type of lubricant particles. In some embodiments, the base layer comprises 0.05 to 0.18 wt. % first type of lubricant particles and 0.02 to 0.15 wt. % second type of lubricant particles. In some embodiments, the first type of lubricant particles or second type of lubricant particles comprise silicon dioxide or highly crosslinked polystyrene.

In some embodiments, the film has a thickness of 1.5 to 6 μm. In some embodiments, the polyester comprises polyethylene napthalate. In some embodiments, the film includes an adhesive layer on a surface of the base layer. In some embodiments, the film includes a low friction coating on a surface of the base layer opposite the adhesive layer.

In some embodiments, a method of making a substrate composite film includes: extruding a base layer comprising polyester, a first type of lubricant particles, and a second type of lubricant particles; and biaxially orienting the base layer. The film may satisfy the follow: (1) a ratio of maximum height SRma and peak count SPc is $1 \leq SRma/SPc \leq 4.5$, (2) a center plane average roughness Sra is 15 to 30 nm, (3) coefficient of dynamic friction is <0.60, and (4) 20 and 60 degree gloss is greater than 160 SGU.

In some embodiments, biaxially orienting the base layer comprises stretching the base layer 3 to 7 times in a machine longitudinal direction and stretching the base layer 3 to 5 times in a transverse direction. In some embodiments, the 20 degree gloss is equal in all directions, and the 60 degree gloss is equal in all directions. In some embodiments, the method includes applying an adhesive layer on a surface of the base layer. In some embodiments, the method includes applying a colored dye layer to the substrate composite film. In some embodiments, the method includes applying a colored dye layer to a surface of the adhesive layer. In some embodiments, the method includes applying a low friction coating on a surface of the base layer, for example, opposite the adhesive layer.

In some embodiments, a film structure for thermal transfer printing includes: a biaxially oriented base layer comprising polyester, a first type of lubricant particles, and a second type of lubricant particles; an adhesive layer on a surface of the biaxially oriented base layer; a colored dye coating on the adhesive layer; and a low friction coating on a surface of the biaxially oriented base layer opposite the adhesive layer. The film structure satisfies the following: (1) a ratio of maximum height SRma and peak count SPc is $1 \leq SRma/SPc \leq 4.5$, (2) a center plane average roughness Sra is 15 to 30 nm, (3) coefficient of dynamic friction is <0.60, and (4) 20 and 60 degree gloss is greater than 160 SGU. In some embodiments, the 20 degree gloss of the film structure is equal in all directions, and the 60 degree gloss is equal in all directions.

BRIEF DESCRIPTION OF THE DRAWINGS

FIG. 1 is a surface image of a substrate composite film according to embodiments of the invention.

DETAILED DESCRIPTION OF THE INVENTION

A dye transfer film that incorporates a substrate composite film is illustrated in FIG. 1. The substrate composite film includes numerous small projections and several large projections on its surface. These projections are intentionally created by adding selected particles into the substrate film. When the film substrate is used in a dye transfer process, such as for bar code printing or photographic image printing, an ink layer is deposited on this surface. The substrate composite film including a base layer and an adhesive layer can be prepared as an intermediate product. That is, the substrate composite film without an ink layer can be wound-up, packaged, typically as wide rolls, and stored for distribution. An ink layer can then be applied to this substrate composite film in a later process. After application of the ink, the dye transfer film may be slit and wound into preselected widths and lengths and packaged as rolls. A preferred end use application for the rolls of the dye transfer film is in interactively operated, automated photograph printing machines.

In some embodiments, a major weight fraction, greater than 50 wt. %, of the base layer of the substrate composite film is polyester. Preferably, the base layer comprises at least about 75 wt. %, at least 90 wt. %, at least 95 wt. %, at least 98 wt. % polyester, or at least 99 wt. % polyester. In some embodiments, the base layer may consist or consist essentially of polyester and lubricant fine particles to create the desired surface texture. The term "consist essentially of" means that the composition consists almost exclusively of the specified components except that additional unspecified component substances which do not materially affect the basic and novel characteristics of this invention can also be present. For example, the base layer may include stabilizers, colorants, antioxidants and other additives as required in such amounts that do not impair inherent performance thereof.

Any conventional thermoplastic such as polyester can be used for the base layer. As used herein the term "polyester" is preferably intended to refer to any thermoplastic film-forming polyester and co-polyester comprising alkylene terephthalate or alkylene naphthalenate as the main recurring units in the polymer chain.

Polyesters comprising alkylene terephthalate as the main recurring units in the polymer chain are preferred. These polyesters are produced mainly by the polycondensation of terephthalic acid or an ester-forming derivative thereof with an alkylene dihydroxyl compound. Examples of the alkylene dihydroxyl compounds include ethylene glycol, propylene glycol, butanediol, neopentyl glycol and the ester-forming derivatives thereof.

The copolyesters can include these polyalkylene terephthalate groups as the main constituent units and another comonomer. Examples of the comonomers that can be used are dicarboxylic acids such as isophthalic, naphthalendicarboxylic, cyclohexanedicarboxylic, adipic, and sebacic acids as well as the substituted derivatives thereof. These dicarboxylic acids can be used in the form of ester-forming derivatives such as lower alcohol esters. Examples of the dihydroxyl compounds for forming the copolyesters include one or more of hydroquinone, dihydroxyphenyl, cyclohexanediol, polyoxyalkylene glycols and the substituted derivatives thereof.

In some embodiments, it is desirable to impart the polyester film with a surface texture such that the center plane average roughness measured on the surface is about 15 to about 30 nm, preferably 20-28 nm. Center plane average roughness smaller than 15 nm typically provides insufficient slipperiness with the result that the obtained film tends to wrinkle during winding at high speed or wrinkle or stick when passing over a thermal printing head. Center plane average roughness larger than 30 nm reduces the gloss of the printed image during printing such that an image with satisfactory gloss cannot be obtained.

In some embodiments, the base layer surface, is defined by the following relationships: Coefficient of dynamic friction is <0.60, $1 \leq SRma/SPc \leq 4.5$, $15$ $nm \leq SRa \leq 30$ $nm$, $160$ $SGU \leq Gloss$, preferably Coefficient of dynamic friction $\geq 0.35$ and $\leq 0.55$, $20$ $nm \leq SRa \leq 28$ $nm$, $160$ $SGU \leq Gloss \leq 180$ SGU in which SRma is difference between the highest peak projection and the deepest valley in the surface, SPc is the number of peaks on the surface, SRa is the center plane average roughness, Gloss is the value which is measured at 20 degree and 60 degree angles. It has been found that a base layer that satisfies these surface characteristics can achieve both good winding capability and good print quality.

In some embodiments the 20 degree gloss is equal in all directions, and the 60 degree gloss is equal in all directions. Having gloss equal in all direction characterizes the particular shape of the particles, which in some embodiments is spherical. The spherical shape allows the surface texture to be the same in all directions which allows air to escape efficiently in any direction. Other particle shapes make "mountain ranges" that either run the MD direction and air cannot easily escape from the winding roll in the TD direction or vice versa. The equal gloss in all directions confirms this particular particle shape and also imparts that surface characteristic to the printed surface so the print gloss is equal in all directions.

The desired surface roughness can be created using lubricant fine particles. The lubricant fine particles may be dispersed within or on the base layer in a manner effective to produce a rough surface texture at a micron or submicron scale. The lubricant can be in an inorganic or organic particulate form and have a particle diameter of 0.1 to 5 μm, preferably 0.4 to 1.8 μm. The particle size can be measured using laser diffraction of the particles suspended in a slurry. The amount of light scattering is detected by photo-electric detectors and the particle size is calculated. An additional range would be preferably 0.4 um to 1.8 um.

Representative lubricants are silicon dioxide, calcium carbonate, alumina, kaolin, highly crosslinked polystyrene and/or silicone particles. A single lubricant particle may be used or two or more different lubricant particles may be used. Preferably, two or more different lubricant particles are used to create different size projections on the surface of the film.

A large amount of particles primarily improves handling performance such as winding capability. On the other hand, a large amount of particles will worsen qualities of the print such as gloss. A small amount of particles improves the quality of the print. However, a small amount of particles worsens the handling performance. It has been found that a particular combination of lubricant size and amount of lubricant can provide both good print quality and good handling performance. Preferably, the lubricants are present in an amount of 0.05 to 0.6 wt %, and more preferably 0.1 to 0.3 wt % of the base layer.

To obtain the special surface film defined above, preferably two or more different kinds of lubricants are used. Preferably, each of the lubricants has a different number average particle diameter. More preferably, the larger lubricant particles are 3 to 15 times larger than the smaller lubricant particles. In addition, preferably the larger lubricant particles are present in the base layer in an amount of 0.05 to 0.18 wt % and the smaller particles are present in the base layer in an amount of 0.02 to 0.15 wt %. For example, to achieve the surface defined above, the base film may contain 0.12 wt % of 2.6 µm particles and 0.07 wt % of 0.8 µm particles. In some embodiments, the larger lubricant particles are 3 to 15 times larger than the smaller lubricant particles or 3 to 8 times larger than the smaller lubricant particles. In addition, in some embodiments, the larger lubricant particles are present in the base layer in an amount of 0.05 to 0.18 wt % and the smaller particles are present in the base layer in an amount of 0.02 to 0.15 wt %. In some embodiments, the larger lubricant particles are present in the base layer in an amount of 0.06 to 0.11 wt % and the smaller particles are present in the base layer in an amount of 0.02 to 0.08 wt %.

The overall thickness of the multilayer dye transfer film is preferably about 0.5 to about 10 µm, and more preferably about 1 to about 6 µm. There is a recent trend toward reduced printer size and increased printing speed. Very thin dye transfer film, preferably as thin as practicable, is more compatible in such conditions and is especially desirable. Usually it is difficult to produce a polyethylene terephthalate film less than 1.5 µm thick. Polyethylene-2,6-naphthalate film has higher strength than the polyethylene terephthalate film and therefore can be made with a thickness as little as about 0.5 µm. Consequently polyethylene-2,6-naphthalate can be used for the base layer polyester component, particularly for end use applications that demand a very thin film. If the thickness of the film is larger than 10 µm, the film tends to reduce heat conductivity for sublimation dye transfer and thereby limits printing speed.

In some embodiments, the base layer can be produced by melt-extruding the layer composition to a film form through a slot die, and electrostatically pinning the molten extrudate onto a chilled casting roller drum to obtain a continuously moving, relatively thick, solid amorphous film. Subsequently the solidified thick film may be biaxially stretched one or more times to provide the desired finished film thickness. The stretching procedure can include heating steps to set and stabilize the film dimensions against shrinkage that might occur during thermal printing operations. In a preferred embodiment, the extruded, amorphous and solidified film is subjected to (i) stretching to about 3 to about 7 times in the machine longitudinal direction at a temperature of Tg to Tg+60° C., (ii) stretching to about 3 to about 5 times in a transverse direction at Tg to Tg+60° C., and thereafter (iii) heating to (Tg+50) to Tg+140° C. for 1 to 100 seconds. Optionally, the film may be heated again while being relaxed in a transverse direction by 0 to 5%.

An adhesive layer can be applied to the polyester base layer during biaxial stretching. Preferably, the adhesive components will be dissolved or dispersed in a liquid. Preferably the liquid is water. In some embodiments the adhesive compound may be a cross-linked acrylic compound. The adhesive solution or dispersion can be applied by conventional techniques such as dip, roller, rod, spray, paint or doctor blade methods, to name a few examples. After application, the liquid can be removed by conventional drying methods, including heat and vacuum, for example, to leave a dry coating of adhesive on the base layer. Preferably, the adhesive solution or dispersion is applied to the surface of the film after machine direction stretching and before transverse direction stretching. The once-stretched film with adhesive deposited thereon then conveniently enters a zone, typically an oven, in which temperature is controlled while transverse direction stretching occurs. During this second stretching step and optional relaxation, heating of the film not only appropriately treats the polyester but also conveniently dries residual liquid from the adhesive solution/dispersion and thermally activates crosslinking of the adhesive components. Alternatively, the adhesive can be applied to the polyester base layer after biaxial stretching and optional relaxation have taken place.

Biaxial stretching according to this invention preferably provides the dye transfer film with a highly uniform thickness. Preferably non-uniformity in longitudinal and transverse directions is from about 0 to about 5%, and more preferably about 0 to about 2%. If the thickness non-uniformity is larger than 5%, a uniform back coat or a uniform sublimable ink layer cannot be formed, thereby deteriorating the traveling properties at the time of printing and printing resolution of the film.

The substrate composite film produced in the continuous orienting process, without an ink layer, can be wound-up in wide rolls, packaged, and stored. In some embodiments, the film is wound-up in rolls having a width greater than 1 meter. This film can then be subsequently processed to apply an ink layer on one surface and a low friction coating on the other surface. If the substrate composite film is coated in the continuous orienting line with an adhesive layer, the preferred surface for ink deposition is upon this adhesive layer. Preferably, the color dye components will be dissolved or dispersed in a liquid. Preferably, the liquid is a solvent such as an acetone, methylethylketone (MEK), touluene, N-methylpyrrolidone (NMP) or isopropyl alcohol. In some embodiments, the solvent is acetone or MEK. The color dye solution or dispersion can be applied by conventional techniques such as meyer rod or gravure cylinder coater machines. Preferably, a gravure cylinder coating method is used. After application, the liquid can be removed by conventional drying methods, including heat and vacuum, for example, to leave a dry coating of color dye on the base layer or upon the adhesive layer.

The substrate composite film, when subsequently coated with a color dye layer for purposes of thermal transfer image production, has better performance against film wrinkling interfering with image quality, and prevents excessive printing machine print head abrasion, when a low friction silicone or wax based layer is applied to the opposite side of the color dye layer. Preferably, the low friction components will be dissolved or dispersed in an aqueous or solvent based solution. Preferably the solution is a solvent such as an acetone, methylethylketone (MEK), touluene, N-methylpyrrolidone (NMP) or isopropyl alcohol. More preferably, the solvent is acetone or MEK. The low friction solution or dispersion can be applied by conventional techniques such as meyer rod or gravure cylinder coater machines. Preferably gravure cylinder coating method is used. After application, the liquid can be removed by conventional drying methods, including heat and vacuum, for example, to leave a dry coating of low friction on the base layer. The low friction layer can be applied to the substrate composite film either before or after the color dye layer is applied; and either applied in a separate process than the color dye application process or in the same process in a multi-stage coating machine. Preferably, the low friction layer is applied before the color dye layer is applied. More preferably, the low friction layer is applied in the same process as the color dye application in a multi-stage coating machine.

EXAMPLES

This invention is now illustrated by examples of certain representative embodiments thereof, wherein all parts, proportions and percentages are by weight unless otherwise indicated. All units of weight and measure not originally obtained in SI units have been converted to SI units.

The following test methods are used in the examples and can be used to measure the properties described within this specification:

(1) Winding Capability

A continuously manufactured mill roll of film from a continuous production line was subsequently slit to widths of 1400 mm to 1600 mm and the slit film was wound in 315 m/minute to lengths of 20,000 m to 60,000 m. It was evaluated by the following standard. Excellent: No wrinkle during winding the film or in any finished roll formation, Allowable: There were some wrinkles at the start or during winding, but the wrinkles disappeared and did not remain in finished roll formation. Unacceptable: There were some wrinkles during winding and/or remained in finished roll formation.

(2) Specular Gloss at 20 Degree Angle

Specular Gloss was measured using a calibrated gloss meter conforming to ASTM D 523. The surface was evaluated by the following standard to obtain high-gloss print. Excellent: The gloss is more than 160 SGU (specular gloss units), Allowable: The gloss is 150 to 160 SGU, Unacceptable: The gloss is less than 150 SGU.

(3) Specular Gloss at 60 Degree Angle

Specular Gloss was measured using a calibrated gloss meter conforming to ASTM D 523. The surface was evaluated by the following standard to obtain high-gloss print. Excellent: The gloss is more than 160 SGU, Allowable: The gloss is 150 to 160 SGU, Unacceptable: The gloss is less than 150 SGU.

(4) Surface Roughness

The values of SRa, SPc SRma were measured by ET-30HK three dimensional roughness analyzer (Kosaka Laboratory LTD). SRa and SRma are measured based on the standard JIS-B0601 (1994). SPc was measured by setting the peak count level to 0.01 μm parallel from the center line of roughness curve. The cutoff value is 0.25 mm, the measuring length is 0.5 mm, the measuring pitch is 5 μm, the load to stylus is 10 mg, the measuring speed is 100 μm/s, the number of measuring is 80 times.

(5) Coefficient of Dynamic Friction

The values of Coefficient of dynamic friction were measured using a calibrated friction meter conforming to ASTM D 1894.

Example 1

A mixture with composition of 0.12 parts by weight of 2.6 μm average diameter silica oxide particles [TORAY PLASTICS (AMERICA), INC.], 0.07 parts by weight of 0.8 μm average diameter highly crosslinked polystyrene particles [Toray Plastics (America), Inc.], and 100 parts by weight 0.65 inherent viscosity polyethylene terephthalate [Toray Plastics (America), Inc.] was supplied to an extruder and melt compounded at 280° C. (536° F.). A molten polymer sheet was cast on a rotating cooling drum having a temperature of 21° C. (70° F.) to prepare amorphous non-stretched film. The thus obtained amorphous non-stretched film was introduced into a plurality of heated rolls and stretched at a draw ratio of 6.0 times at 121° C. (250° F.) in a longitudinal stretching process and subsequently cooled by rollers having a temperature of 21° C. (70° F.). Then, an adhesive coating solution of the composition shown in Table 1 was applied on one side of the uniaxially oriented film. This coated film was led into a tenter which grasps both end positions of film by clips, and therein the film was dried and preheated at a temperature of 100° C. (212° F.). Then the film was stretched in the transverse direction at a draw ratio of 4.0 times at a temperature of 116° C. (240° F.). After that, the film was heat treated at 230° C. (446° F.) and relaxed 4.0% by width in the transverse direction, to obtain biaxially oriented polyester film with 4.5 micrometers thickness. Winding capability and gloss of the film were evaluated, and the results are shown in Table 1.

Examples 2-8 and Comparative Examples 1-8

The procedure of Example 1 was repeated except that the compositions of the particle and final thickness of the polyester film were changed as shown in Table 1. In these examples, the particle which has 0.2 μm average diameter is silica oxide particle. Winding capability and gloss of the film were evaluated and the results are shown in Table 1.

In Comp. Exs. 1-3, the small particles were absent from the base layer composition, large particles were absent from the base layer composition of Comp. Exs. 8. All of the operative Examples 1-8 demonstrate that superior winding capability and fully acceptable gloss was obtained according to this invention.

Although specific forms of the invention have been selected in the preceding disclosure for illustration in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claim.

TABLE 1

| | Large particle diameter(μm) | Small particle diameter(μm) | Amount of large particle (wt %) | Amount of small particle (wt %) | Coefficient of dynamic friction | Thickness (μm) | SRma (nm) | SPc | SRma/SPc | SRa (nm) | Winding | Gloss |
|---|---|---|---|---|---|---|---|---|---|---|---|---|
| Example 1 | 2.6 | 0.8 | 0.107 | 0.070 | 0.52 | 4.5 | 1510 | 600 | 2.5 | 24 | Excellent | Excellent |
| Example 2 | 2.6 | 0.8 | 0.107 | 0.040 | 0.53 | 4.5 | 1500 | 330 | 4.5 | 22 | Allowable | Excellent |
| Example 3 | 2.6 | 0.8 | 0.107 | 0.100 | 0.50 | 4.5 | 1520 | 860 | 1.8 | 27 | Excellent | Allowable |
| Example 4 | 2.6 | 0.8 | 0.087 | 0.070 | 0.54 | 4.5 | 1410 | 570 | 2.5 | 20 | Allowable | Excellent |
| Example 5 | 2.6 | 0.8 | 0.157 | 0.070 | 0.51 | 4.5 | 1820 | 650 | 2.8 | 29 | Excellent | Allowable |
| Example 6 | 2.6 | 0.2 | 0.107 | 0.070 | 0.59 | 4.5 | 1490 | 340 | 4.4 | 19 | Allowable | Excellent |
| Example 7 | 2.6 | 0.8 | 0.107 | 0.070 | 0.53 | 2 | 1550 | 700 | 2.2 | 25 | Allowable | Excellent |
| Example 8 | 2.6 | 0.8 | 0.107 | 0.070 | 0.51 | 6 | 1460 | 550 | 2.7 | 23 | Excellent | Excellent |
| Comparative Example 1 | 2.6 | — | 0.511 | 0.000 | 0.46 | 4.5 | 2230 | 340 | 6.6 | 63 | Excellent | Unacceptable |
| Comparative Example 2 | 2.6 | — | 0.127 | 0.000 | 0.68 | 4.5 | 1590 | 150 | 10.6 | 25 | Unacceptable | Excellent |
| Comparative Example 3 | 2.6 | — | 0.264 | 0.000 | 0.48 | 4.5 | 2100 | 260 | 8.1 | 35 | Excellent | Unacceptable |
| Comparative Example 4 | 2.2 | 0.2 | 0.135 | 0.254 | 0.53 | 4.5 | 2230 | 760 | 2.9 | 37 | Allowable | Unacceptable |
| Comparative Example 5 | 2.6 | 0.2 | 0.317 | 0.001 | 0.47 | 4.5 | 2150 | 280 | 7.7 | 43 | Excellent | Unacceptable |
| Comparative Example 6 | 2.6 | 0.2 | 0.107 | 0.001 | 0.71 | 4.5 | 1500 | 300 | 5.0 | 20 | Unacceptable | Excellent |
| Comparative Example 7 | 2.6 | 0.8 | 0.264 | 0.070 | 0.46 | 4.5 | 2100 | 700 | 3.0 | 38 | Excellent | Unacceptable |
| Comparative Example 8 | — | 0.8 | 0.000 | 0.050 | 0.75 | 4.5 | 400 | 720 | 0.6 | 16 | Unacceptable | Excellent |

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A substrate composite film for thermal transfer printing comprising:
   a sequentially biaxially oriented layer comprising polyester, a first type of lubricant particles, and a second type of lubricant particles,
   wherein the substrate composite film satisfies the following:
   (1) a ratio of maximum height SRma and peak count SPc is $1 \leq SRma/SPc \leq 4.5$,
   (2) a center plane average roughness Sra is 15 to 30 nm,
   (3) coefficient of dynamic friction is <0.60, and
   (4) 20 and 60 degree gloss is greater than 160 SGU.

2. The substrate composite film of claim 1, wherein the 20 degree gloss is equal in all directions, and the 60 degree gloss is equal in all directions.

3. The substrate composite film of claim 1, wherein the first type of lubricant particles have a number average particle diameter 3 to 15 times larger than and the second type of lubricant particles.

4. The substrate composite film of claim 3, wherein the sequentially biaxially oriented layer comprises 0.05 to 0.18 wt. % first type of lubricant particles and 0.02 to 0.15 wt. % second type of lubricant particles.

5. The substrate composite film of claim 1, wherein the first type of lubricant particles or second type of lubricant particles comprise silicon dioxide or highly crosslinked polystyrene.

6. The substrate composite film of claim 1, wherein the film has a thickness of 1.5 to 6 μm.

7. The substrate composite film of claim 1, wherein the polyester comprises polyethylene napthalate.

8. The substrate composite film of claim 1, further comprising an adhesive layer on a surface of the sequentially biaxially oriented layer.

9. The substrate composite film of claim 8, further comprising a low friction coating on a surface of the sequentially biaxially oriented layer opposite the adhesive layer.

10. A method of making a substrate composite film comprising:
   extruding a layer comprising polyester, a first type of lubricant particles, and a second type of lubricant particles; and
   sequentially biaxially orienting the layer,
   wherein the substrate composite film satisfies the following:
   (1) a ratio of maximum height SRma and peak count SPc is $1 \leq SRma/SPc \leq 4.5$,
   (2) a center plane average roughness Sra is 15 to 30 nm,
   (3) coefficient of dynamic friction is <0.60, and
   (4) 20 and 60 degree gloss is greater than 160 SGU.

11. The method of claim 10, wherein biaxially orienting the layer comprises stretching the layer 3 to 7 times in a machine longitudinal direction and stretching the layer 3 to 5 times in a transverse direction.

12. The method of claim 10, wherein the 20 degree gloss is equal in all directions, and the 60 degree gloss is equal in all directions.

13. The method of claim 10, wherein the first type of lubricant particles have a number average particle diameter 3 to 15 times larger than and the second type of lubricant particles.

14. The method of claim 13, wherein the layer comprises 0.05 to 0.18 wt. % first type of lubricant particles and 0.02 to 0.15 wt. % second type of lubricant particles.

15. The method of claim 10, wherein the first type of lubricant particles or second type of lubricant particles comprise silicon dioxide or highly crosslinked polystyrene.

16. The method of claim 10, wherein the film has a thickness of 1.5 to 6 µm after biaxial orientation.

17. The method of claim 10, wherein the polyester comprises polyethylene napthalate.

18. The method of claim 10, further comprising applying an adhesive layer on a surface of the layer.

19. The method of claim 18, further comprising applying a colored dye layer to a surface of the adhesive layer.

20. The method of claim 18, further comprising applying a low friction coating on a surface of the layer opposite the adhesive layer.

21. The method of claim 10, further comprising applying a colored dye layer to the substrate composite film.

22. A film structure for thermal transfer printing comprising:
 a sequentially biaxially oriented layer comprising polyester, a first type of lubricant particles, and a second type of lubricant particles;
 an adhesive layer on a surface of the sequentially biaxially oriented layer;
 a colored dye coating on the adhesive layer; and
 a low friction coating on a surface of the sequentially biaxially oriented opposite the adhesive layer,
 wherein the film structure satisfies the following:
 (1) a ratio of maximum height SRma and peak count SPc is $1 \leq SRma/SPc \leq 4.5$,
 (2) a center plane average roughness Sra is 15 to 30 nm,
 (3) coefficient of dynamic friction is <0.60, and
 (4) 20 and 60 degree gloss is greater than 160 SGU.

23. The film structure of claim 22, wherein the 20 degree gloss is equal in all directions, and the 60 degree gloss is equal in all directions.

* * * * *